United States Patent
Hwang

(10) Patent No.: US 7,396,521 B2
(45) Date of Patent: Jul. 8, 2008

(54) HEAT TRANSFER FLUIDS WITH HETERO-NANOCAPSULES

(75) Inventor: Gan-Lin Hwang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/480,362

(22) Filed: Jul. 5, 2006

(65) Prior Publication Data

US 2007/0122335 A1    May 31, 2007

(30) Foreign Application Priority Data

Nov. 30, 2005    (TW)    ............... 94142040 A

(51) Int. Cl.
*D01F 9/12*    (2006.01)
(52) U.S. Cl. .................... 423/447.1; 252/511; 423/173; 428/221; 524/496
(58) Field of Classification Search ............. 423/447.1, 423/173; 524/496; 252/511; 428/221
See application file for complete search history.

(56) References Cited

U.S. PATENT DOCUMENTS

| | | | |
|---|---|---|---|
| 2002/0100578 A1* | 8/2002 | Withers et al. | 165/80.4 |
| 2004/0021204 A1* | 2/2004 | Liu et al. | 257/615 |
| 2004/0238799 A1* | 12/2004 | Hwang et al. | 252/511 |
| 2005/0244326 A1* | 11/2005 | Colbert et al. | 423/447.1 |

FOREIGN PATENT DOCUMENTS

GB    2432841 A   *   6/2007

* cited by examiner

*Primary Examiner*—Peter D. Mulcahy
*Assistant Examiner*—Henry Hu
(74) *Attorney, Agent, or Firm*—Birch, Stewart, Kolasch & Birch, LLP

(57) ABSTRACT

A heat transfer fluid with hetero-nanocapsules. The heat transfer fluid comprises a fluid and a plurality of hetero-nanocapsules, uniformly dispersed in the fluid, in an amount of 0.01 to 10 parts by weight, based on 100 parts by weight of the heat transfer fluid. Since the hetero-nanocapsules are apt to disperse in fluid and have superior thermal conductivity, the heat conduction capability of the heat transfer fluid therewith is enhanced.

12 Claims, 4 Drawing Sheets

HEAT TRANSFER FLUIDS WITH HETERO-NANOCAPSULES

BACKGROUND OF THE INVENTION

1. Field of the Invention

The invention relates to a heat transfer fluids, and in particular relates to a heat transfer fluids with hetero-nanocapsules.

2. Description of the Related Art

The electric power consumption results in generation of heat during the operation of devices such as computers, electronic equipments, or communication apparatuses. Since the rate of device aging is in direct ratio to the operating temperature thereof, the operating temperature must to be maintained within a specific range in order to prevent the device from being affected by the generated heat. Therefore, it is important to design a device with superior heat dissipation capability.

With the development and advancement of technology, efficiency and convenience are important orientations in the use of electronic products that are desirably made with low profile, multiple functions and highly efficient operation. With respect to semiconductor industry and integrated circuit (IC) design, although it has successfully attained to important improvements such as profile miniaturization, high integration and multi-functions for electronic elements, reliability issue is generated due to heat production during operation of the electronic elements.

A conventional cooling device having a heat sink and a small fan mounted in association with the electric device, however, cannot meet the demand for efficient dissipation of the electronic device. Moreover, noise is generated during the operation of the fan.

Recently, with the development and wide application of electronic products, such as mobile phones, PDA, and notebook computers, there has been an increasing demand for electronic devices which have longer run-time and occupy less space. Accordingly, the heat in the device excessively accumulates and is concentrated, thus creating a challenge for heat dissipating technology.

Higher efficiency heat dissipating technology such as fluid cooling is often required. In a conventional fluid cooling system for a notebook computer, pure water serves as a heat transfer fluid in general. However, for many applications, the thermal conductivity of pure water is too low. The rate of heat transmission is too slow, and the operating efficiency of the heat pipe is unsatisfactory.

Therefore, it is necessary to develop a novel heat transfer fluid with high thermal conductivity and suitable mobility for electronic devices such as notebook computers.

BRIEF SUMMARY OF THE INVENTION

The invention provides a heat transfer fluid with carbon nanocapsules serving as cooling liquid for a heat dissipation system such as a Micro-Fluid Heat Exchanger. The heat transfer fluid comprises a fluid and a plurality of hetero-nanocapsules, uniformly dispersed in the fluid, in an amount of 0.01 to 10 parts by weight, more preferably 0.05 to 4 parts by weight, based on 100 parts by weight of the heat transfer fluid.

The hetero-nanocapsules is a carbon nanocapsule containing heteroatoms, comprising a closed graphite layer represented by a chemical formula C(D)x, wherein C is a carbon exhibiting $sp^2$ hybrid orbital, D is a atom of Group III or V of the periodic table bonded to the carbon, and X is a molar equivalent from 0.0001 to 0.1, based on the molar equivalent of carbon as 1. Since the hetero-nanocapsules are apt to dispersal in fluid and have superior thermal conductivity, the heat conduction capability of the heat transfer fluid is enhanced.

Particularly, the D comprises N, B, P, or S atoms and can further bond with hydrogen, alkyl group, alkoxy group, halogen, hydroxyl group, amino group, metal, or metal complex are modified to form covalent or coordination bonds.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present application, and wherein.

DETAILED DESCRIPTION OF THE PREFERRED EMBODIMENTS

The following description is of the best-contemplated mode of carrying out the invention. This description is made for the purpose of illustrating the general principles of the invention and should not be taken in a limiting sense. The scope of the invention is best determined by reference to the appended claims.

The heat transfer fluid comprises a fluid and a plurality of hetero-nanocapsules disperse uniformly in the fluid. The fluid can be water or organic solvent (such as alcohol or engine oil). In some embodiments of the invention, the fluid is water, methanol, ethanol, n-propanol, iso-propanol, n-butanol, iso-butanol, t-butanol, t-pentanol, ethylene glycol, ethylene glycol monomethyl ether, ethylene glycol monoethyl ether, propylene glycol monoethyl ether, styrene, ethyl acetate, toluene, xylene, methyl ethyl ketone, acetone, engine oil, or combinations thereof.

Figure 1:
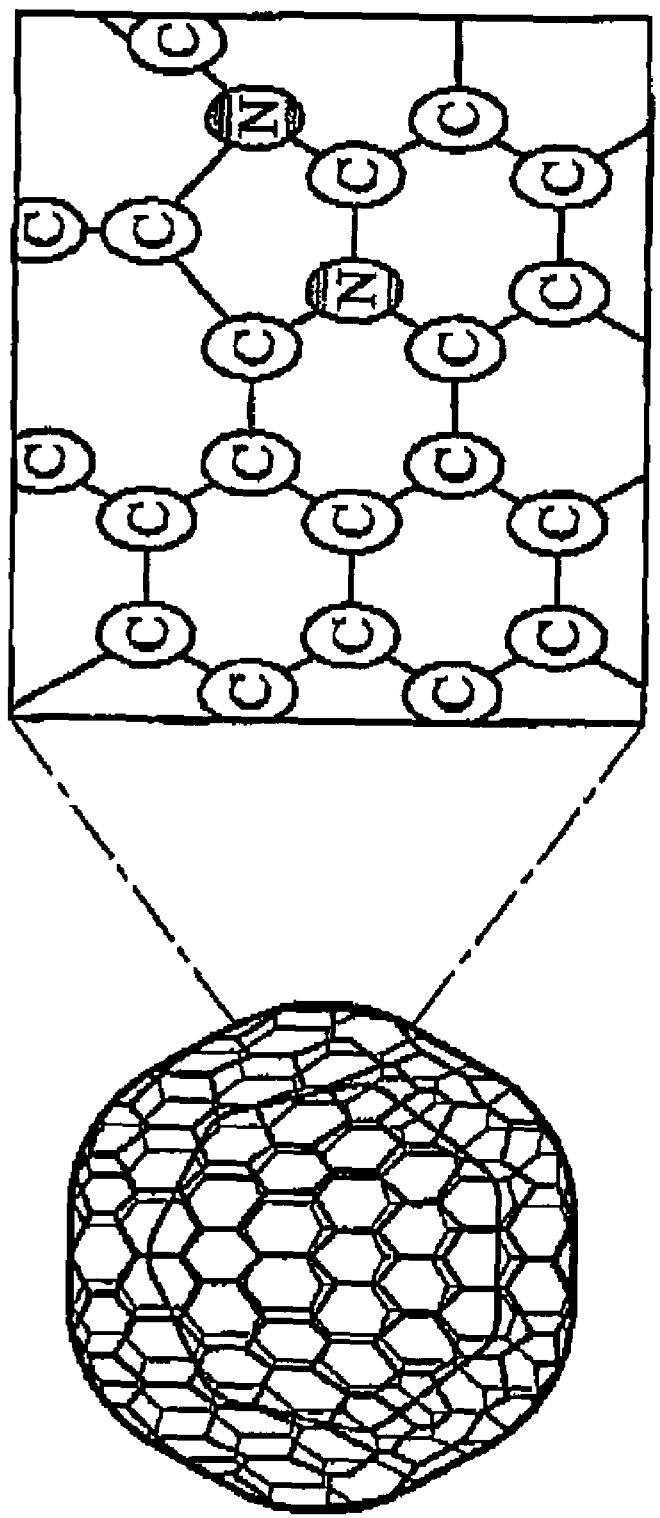
FIG. 1 is a close-up schematic drawing of carbon nanocapsules containing heteroatoms according to the invention.

In the invention, the hetero-nanocapsules are carbon nanocapsules containing heteroatoms and can be polyhedral carbon clusters with completed and closed polyhedral graphite layers. In carbon nanocapsule containing heteroatoms of the invention, some carbon atoms are replaced with atoms of Group III or V of the periodic table, such as nitrogen, boron, phosphorous or sulfur atoms, as shown in FIG. 1. Due to the doped heteroatom, the nanocapsule exhibits specific properties of atoms of Group III or V, such as hole-rich or electron-rich ferromagnetism. The graphite layer with heteroatoms replacing the carbon atoms is made up of pentagonal and hexagonal rings, atoms thereof exhibiting $sp^2$ hybrid orbital. The carbon nanocapsule containing heteroatoms exhibits unsaturated double bonds while retaining the specific properties of graphite.

Figure 2:
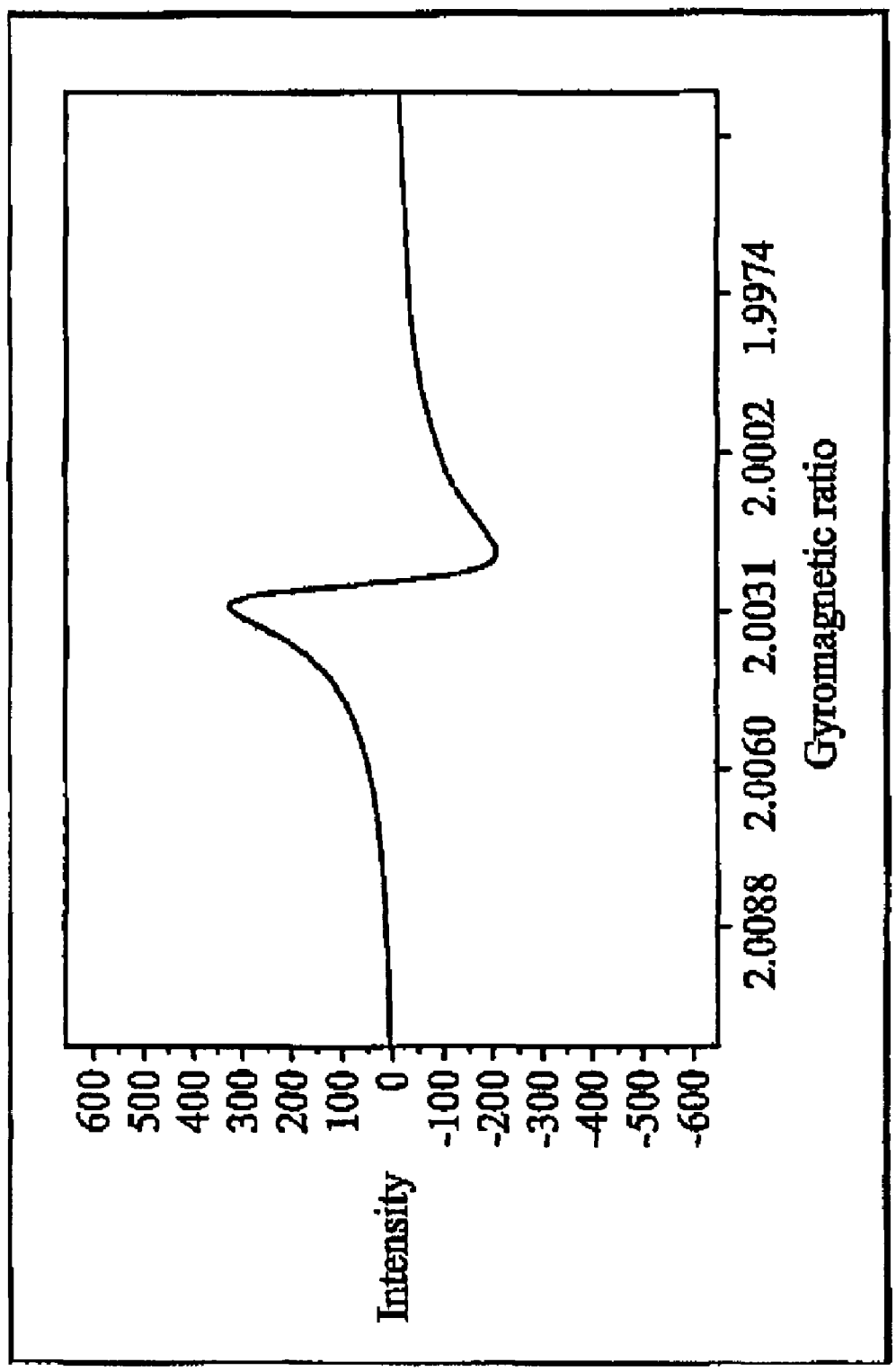
FIG. 2 is an electron paramagnetic resonance spectrum of doped-B carbon nanocapsules of the invention.

Referring to FIG. 2, the doped-B carbon nanocapsules are characterized by electron paramagnetic resonance spectroscopy. Accordingly, the heteroatoms (D) of the carbon nanocapsules exhibit lone pair electrons.

Figure 3:
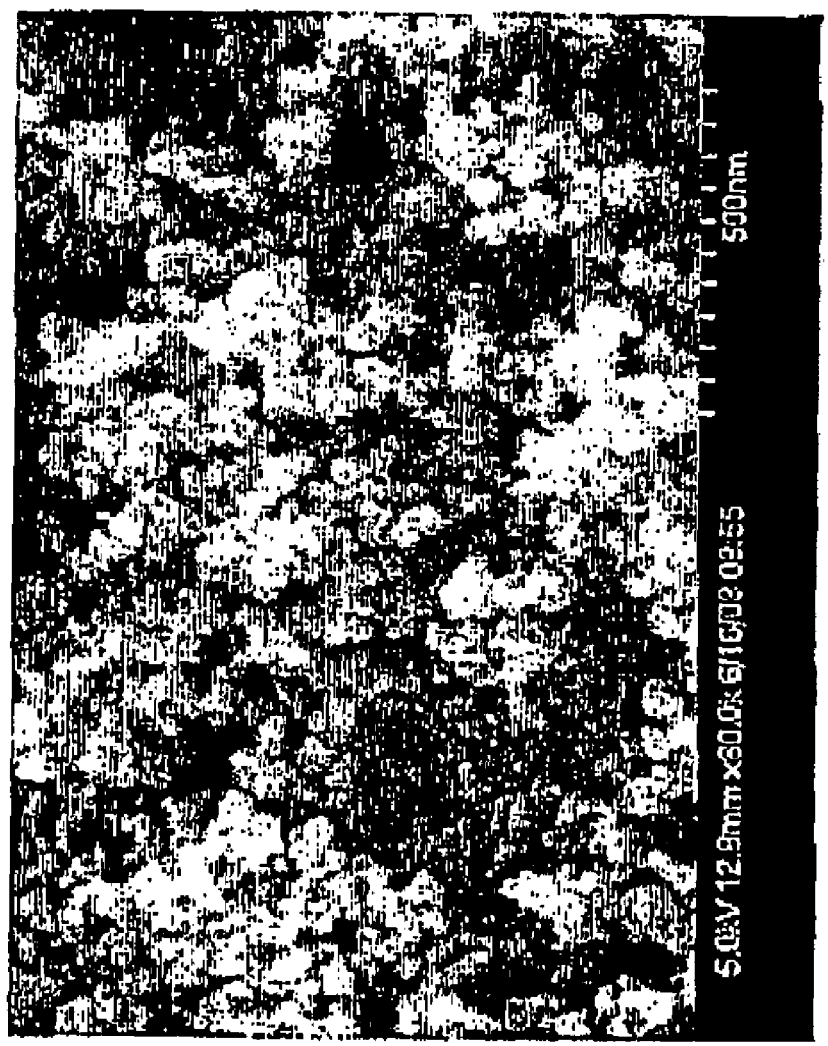
FIG. 3 is a high resolution SEM (scanning electron microscope) photograph of doped-N carbon nanocapsules in one example of the invention.

Since the heteroatoms, such as N, favor exhibition of $sp^3$ hybrid orbital and prefer to locate on the corners of the polyhedral graphite layer, namely on the pentagonal rings, the carbon nanocapsules containing heteroatoms exhibit superior electric and thermal conductivity in comparison with undoped carbon nanocapsules. Theoretically, nitrogen atoms located at the corners of the polyhedral graphite layer exhibits a different configuration from those on the hexagonal rings. The polyhedral graphite layer of the hetero-nanocapsules can have, but is not limited to, 12 corners. FIG. 3 is a high resolution SEM (scanning electron microscope) photograph of the hetero-nanocapsules in an embodiment of the invention Due to the electron-rich or electron-poor characters of the heteroatoms (such as N, B, P, or S atoms), the hetero-nanocapsules are apt to disperse into water or high polarity solvent. Further, the heteroatoms of the carbon nanocapsules can bond with hydrogen, alkyl group, alkoxy group, halogen group, hydroxyl group, amino group, metal, or metal complex and be charged, improving the solubility of the carbon nanocapsules in fluid.

Figure 4:
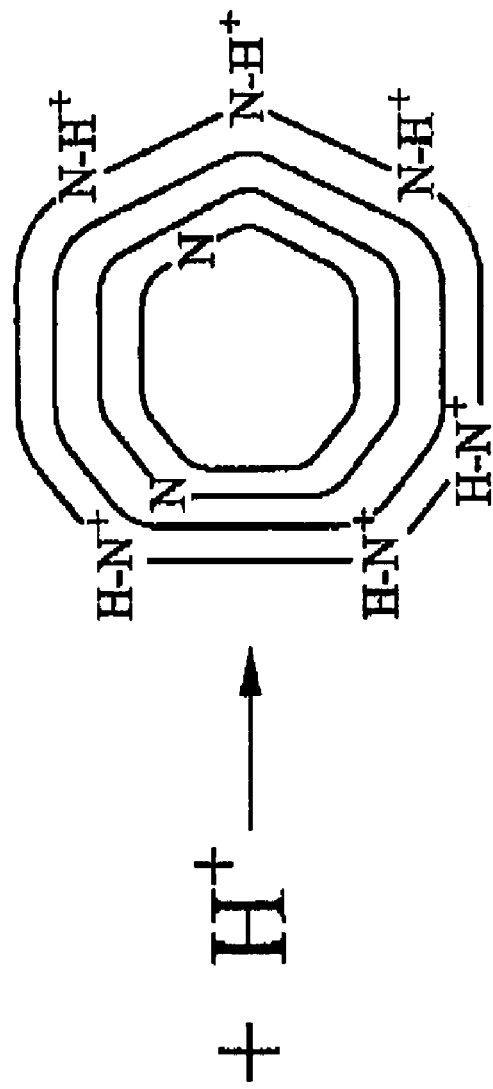
FIG. 4 shows the positive charge migrating to the nitrogen atom when nitrogen atom bonds with a hydrogen ion ($H^+$).

In some embodiments of the invention, the carbon nanocapsule is a Doped-N carbon nanocapsule. Referring to FIG. 4, when nitrogen atom bonds with a hydrogen ion ($H^+$), the positive charge migrates to the nitrogen atom, resulting in the Doped-N carbon nanocapsule charged with positive electricity. Due to the electricity, the carbon nanocapsules can uniformly disperse into the fluid without addition of surfactant.

The carbon nanocapsule can be hollow and comprise a graphite layer. Furthermore, the carbon nanocapsule can comprise two graphite layers and be filled with 0.1~80 wt % fillers, such as metal, metal oxide, metal carbides, metal sulfide, metal nitride, metal borate, or alloy, based on the weight of the nanocapsule. Suitable metals or metallines can comprise, without being limited to, Sc, V, Cr, Fe, Co, Ni, Cu, Y, Zr, Mo, Ru, Rh, Pd, La, Ce, Pr, Nd, Gd, Tb, Dy, Ho, Er, Tm, Lu, Ta, Os, Ir, Pt, Au, Th, U, or combinations thereof. The heat transfer fluid with carbon nanocapsule filled with magnetic filters exhibits magnetic activity and can be used in Micro-Fluid Heat Exchanger with applied magnetic or electric field.

Since the hetero-nanocapsules have superior thermal conductivity (more than 1800 W/mK), large surface area, and lightweight characteristics, the heat transfer fluid is more apt to more efficiently remove the heat. Further, since the carbon nanocapsules have diameters of less than 100 nm (most of them between 30 to 40 nm) and superior thermal stability, the heat transfer fluid is suitable for heat dissipation system employing a Micro-Fluid Heat Exchanger with a diameter less than 10 μm.

Preparation of Heat Transfer Fluid with Hetero-Nanocapsules 100 mg of doped-N nanocapsules was added into 100 g of pure water, and 0.1 wt % heat transfer fluid with hetero-nanocapsules was obtained.

Properties of Heat Transfer Fluid with Water-Soluble Carbon Nanocapsules

The measured results of properties for the 0.1wt % heat transfer fluid with hetero-nanocapsules is shown in Table 1.

TABLE 1

|  | Pure-water | 0.1 wt % doped-N nanocapsules in water |
| --- | --- | --- |
| Thermal conductivity (W/mk) | 0.64 | 0.92 |

As described in Table 1, since the thermal conductivity of the heat transfer fluid is larger than that of pure water, the addition of hetero-nanocapsules enhances the heat dissipation capability of water.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A heat transfer fluid with carbon nanocapsules, comprising:
    a fluid; and
    a plurality of hetero-nanocapsules uniformly dispersed in the fluid,
    wherein each hetero-nanocapsule is a carbon nanocapsules containing heteroatoms, comprising a closed graphite layer represented by a chemical formula C(D)x, wherein C is a carbon exhibiting $sp^2$ hybrid orbital, D is an atom of Group III or V of the periodic table bonded to the carbon, and X is a molar equivalent from 0.0001 to 0.1, based on the molar equivalent of carbon as 1.

2. The heat transfer fluid as claimed in claim 1, wherein the hetero-nanocapsules are present in an amount of 0.01 to 10 parts by weight, based on 100 parts by weight of the heat transfer fluid.

3. The heat transfer fluid as claimed in claim 1, wherein the hetero-nanocapsule is a polyhedral carbon cluster constituting multiple graphite layers having a balls-within-a ball structure.

4. The heat transfer fluid as claimed in claim 1, wherein D comprises N, B, or P, or S atoms.

5. The heat transfer fluid as claimed in claim 1, wherein D is bonded with hydrogen, alkyl group, alkoxy group, halogen, hydroxyl group, amino group, metal, or metal complex.

6. The heat transfer fluid as claimed in claim 1, wherein the heteroatom-containing carbon nanocapsule is hollow.

7. The heat transfer fluid as claimed in claim 1, wherein the hetero-nanocapsule is a metal-filled carbon nanocapsule filled with metals, metal oxides, metal carbides, metal sulfide, metal nitride, metal borate or alloys.

8. The heat transfer fluid as claimed in claim 7, wherein the metal atom of the metal, metal oxide, metal carbide, metal sulfide, metal nitride, metal borate, or alloy comprises Sc, V, Cr, Fe, Co, Ni, Cu, Y, Zr, Mo, Ru, Rh, Pd, La, Ce, Pr, Nd, Gd, Tb, Dy, Ho, Er, Tm, Lu, Ta, Os, Ir, Pt, Au, Th, U or a combination thereof.

9. The heat transfer fluid as claimed in claim 1, wherein the diameter of the hetero-nanocapsule is 1-100 nm.

10. The heat transfer fluid as claimed in claim 1, wherein the fluid is water, organic solvent or combinations thereof.

11. The heat transfer fluid as claimed in claim 1, wherein the fluid is alcohol.

12. The heat transfer fluid as claimed in claim 1, wherein the fluid is water, methanol, ethanol, n-propanol, iso-propanol, n-butanol, iso-butanol, t-butanol, t-pentanol, ethylene glycol, ethylene glycol monomethyl ether, ethylene glycol monoethyl ether, propylene glycol monoethyl ether, styrene, ethyl acetate, toluene, xylene, methyl ethyl ketone, acetone, engine oil, or combinations thereof.

* * * * *